3,793,257
OLEFIN ISOMERIZATION AND/OR HYDROGENA-
TION THROUGH RUTHENIUM HYDRIDE COM-
PLEX-CATALIZED PROCESSES
Filippo Pennella and Mark R. Rycheck, Bartlesville,
Okla., assignors to Phillips Petroleum Company
No Drawing. Filed Nov. 1, 1971, Ser. No. 194,698
Int. Cl. C07c 5/00, 5/14
U.S. Cl. 260—683.2
23 Claims

ABSTRACT OF THE DISCLOSURE

Ruthenium hydride complexes containing tertiary phosphine, arsine, or stibine ligands are employed as catalysts for isomerization and/or hydrogenation of olefins. Terminally unsaturated olefins are selectively isomerized to internally unsaturated olefins by complexes that contain nitrogen or ammonia.

---

This invention relates to olefin double bond isomerization and/or olefin hydrogenation by contacting an olefin with a ruthenium hydride complex containing tertiary phosphine, arsine, or stibine ligands.

Various processes for isomerizing and/or hydrogenating olefins are known in the art. In general, prior art processes suffer from one or more limitations such as excessive olefin cracking, undesirable olefin polymerization, excessive randomization, or unfavorable economics. The transition metals of Group VIII in elemental, compound and complex form, including such compounds as ruthenium chloride, ruthenium oxide, dichlorotris(triphenylphosphine)ruthenium (II), are known to have activity as catalysts for isomerization and/or hydrogenation of olefins. The identification of new catalyst systems which are effective isomerization and/or hydrogenation catalysts, particularly where the catalyst systems can be applied selectively in a predictable manner, is of continuing interest and of potential economic benefit to the chemical industry at large.

It is an object of this invention to provide a process for the double bond isomerization of olefins. In addition, it is an object to catalytically isomerize terminal olefins into internal olefins. Another object is to provide a process for the isomerization of straight-chain terminal olefins to straight-chain internal olefins wherein the internal olefin mixtures contain substantially more trans isomers than cis isomers. In addition, it is an object to provide catalyst systems which catalyze the conversion of terminally unsaturated olefins to internally unsaturated olefins and inhibit the conversion of internal olefins to terminally unsaturated olefins. Still another object is to provide a process for the hydrogenation of olefins. Other objects, aspects and advantages of this invention will be apparent from the written description and the appended claims.

According to this invention, the double bond of an isomerizable olefin reactant is shifted by contact with a ruthenium hydride complex containing tertiary phosphine, arsine or stibine ligands. In addition, an olefin is hydrogenated by contact with hydrogen and a ruthenuim hydride complex.

The ruthenium hydride complex employed in this invention, can be represented by the formula $$(R_3Q)_3RuH_2Z$$

wherein each Q is independently selected from phosphorus, arsenic, and antimony; Z is selected from $H_2$, $N_2$, or $NH_3$; and wherein each R is independently selected from organic radicals containing up to 20 carbon atoms. Preferably the organic radical is free of active hydrogen atoms and reactive unsaturation. Preferred R groups are alkyl, cycloalkyl and aryl hydrocarbyl radicals and mixtures thereof, such as alkaryl, aralkyl, alkcycloalkyl, with each R group containing up to 10 carbon atoms.

Some examples of suitable ruthenium complexes are:

(triphenylphosphine)$_3$RuH$_4$
(triethylphosphine)$_3$RuH$_2$(N$_2$)
[(4-methylphenyl)$_3$phosphine]$_3$RuH$_4$
(phenyldimethylphosphine)$_3$RuH$_2$(NH$_3$)
(diphenylmethylphosphine)$_3$RuH$_4$
(dimethyllaurylarsine)$_3$RuH$_2$(N$_2$)
(trimethylarsine)$_3$RuH$_4$
(tribenzylarsine)$_3$RuH$_2$(NH$_3$)
(tricyclohexylarsine)$_3$RuH$_4$
(trieicosylarsine)$_3$RuH$_2$(N$_2$)
(triphenylstibine)$_3$RuH$_4$
[(4-methylcyclohexyl)$_3$phosphine]$_3$RuH$_4$
(tridecylstibine)$_3$RuH$_2$(NH$_3$)
(triphenylphosphine)$_2$(triphenylarsine)RuH$_4$
(triisobutylstibine)$_3$RuH$_2$(N$_2$)
(trioctylstibine)$_3$RuH$_2$(NH$_3$)
(triphenylphosphine)$_3$RuH$_2$(N$_2$)

and admixtures thereof.

The ruthenium hydride complexes of this invention can be prepared by any convenient method known in the art. Generally convenient methods are illustrated in the Journal of the American Chemical Society (JACS) 90, 7172 (1968) and JACS 92, 3011 (1970). An example of a convenient method is the reaction of a suitable ruthenium compound with an alkali metal borohydride in the presence of an alcohol, such as the reaction resulting from an admixture of dichlorotris(triphenylphosphine)ruthenium and sodium borohydride in methanol to yield tetrahydridotris(triphenylphosphine)ruthenium.

The ruthenium dinitrogen and ammonia complexes can be prepared conveniently by the addition of nitrogen or ammonia directly to a (R$_3$Q)$_3$RuH$_4$ complex. A general procedure is provided by JACS 90, 7172 (1968) and JACS 92, 3001–3016 (1970).

The ruthenium complexes employed in this invention are air-sensitive and are generally unstable in the presence of air or oxygen-containing atmospheres. Accordingly, the preparation and use thereof should exclude or appreciably restrict air or oxygen, as well as exclude any reactive substance or atmospheres which tend to reduce the effectiveness of the complex in an isomerization or hydrogenation process.

In general, the ruthenium complexes have limited solubility in commercially important olefin isomerization and hydrogenation process feedstocks. Advantageously, in some cases, therefore, the complex is employed in the presence of substantially inert solvents to facilitate mixing of olefin reactant and ruthenium catalyst. Representative inert organic solvents which can be used include aromatic hydrocarbons including benzene, toluene, ortho-xylene, meta-xylene, para-xylene, as well as other inert solvents including tetrahydrofuran and similar solvents.

The ruthenium complexes can be employed in heterogeneous catalytic olefin isomerization and hydrogenation reactions by depositing the complex on a solid inorganic oxide catalyst support. Such support materials are commonly known as refractory oxides and include synthetic materials as well as acid treating clays or the crystalline aluminosilicates known in the art as molecular sieves. Synthetic refractory oxides are preferred. Exemplary synthetic refractory oxides include silica, alumina, silica-alumina, silica-magnesia, boria-alumina, silica-aluminia-zirconia, and silica-titania-zirconia. Preferably, the support, prior to contact with the complex, is dried by calcining. Such a supported catalyst preferably contains from about 1 to about 10 weight percent ruthenium complex based on the weight of support.

An advantage of this invention resides broadly in the efficient conversion of terminally unsaturated olefins to internally unsaturated olefins. This invention also finds particular utility with respect to the conversion of terminally unsaturated olefins to internally unsaturated olefins wherein significant quantities of trans olefin isomers are desired. This trans olefin isomer utility is quite surprising and unexpected. Ordinarily, in mixtures of internally unsaturated isomers, such as isomers unsaturated at the second to third carbon atom position, substantial quantities of both cis and trans forms of olefin isomer are present, with the trans form being generally slightly predominant. In addition, it is generally considered that the mechanism of double bond isomerization transformation is such that the olefin is presumed to go through the cis isomer stage, thus resulting in substantial quantities of cis isomers being present at all times. The conversion of olefins $(R_3Q)_3RuH_2 Z$ catalyst in accordance with this invention apparently does not follow this mechanism.

Another feature of the invention is that the $(R_3Q)_3RuH_2(N_2)$ and $R_3Q)_3RuH_2(NH_3)$ complex compositions of this invention inhibit the conversion of internally unsaturated olefins to terminally unsaturated olefins, thus resulting in substantial improvement in yield of internally unsaturated olefins. Thus, the process for conversion of olefins according to this invention an be employed to prepare internally unsaturated olefins as well as to selectively prepare trans olefin isomers.

Still another feature of this invention is that the $(R_3Q)_3RuH_4$ complex compositions promote the hydrogenation of olefin, whereas the $(R_3Q)_3RuH_2(N_2)$ and $(R_3Q)_3RuH_2NH_3$ complex compositions inhibit the hydrogenation of olefins. Accordingly the $(R_3Q)_3RuH_4$ complex compositions are preferably employed in isomerization and/or hydrogenation processes.

Any isomerizable olefin can be employed in the practice of this invention including acyclic monoenes and acyclic polyenes embracing diennes, trienes, conjugated diolefins, nonconjugated diolefins, mixtures thereof, and the like. The olefins can contain cycloalkyl or aryl substituents or mixtures thereof. Because of their commercial importance, preferred olefins contain from 4 to 20 carbon atoms per molecule, and more preferably from 4 to 10 carbon atoms per molecule. Representative olefins are the following: 1-butene, 1-pentene, 1-hexene, 3-hexene, 1-decene, 5-methyl-1-hexene, 7-methyl-1-nonene, 5-ethyl-1- octene, 2-butene, 2-pentene, 4-methyl-2-hexene, 4-phenyl-1butene, 5-cyclopentyl-1-pentene, 4-phenyl-2-butene, 5-isopropyl-2-heptene, 2-decene, 2,3,4-trimethyl-6-dodecene, 1,3-tetradecadiene, 4-eicosene, 1-(3-butenyl)-4-ethylbenzene, 1-(3-pentenyl)-3-methylcycloheptane, 1,3-octadiene, 1,4,7-decatrine, and the like, and mixtures thereof.

Any hydrogenatable olefin can be employed in the practice of this invention including acyclic monoenes and acyclic polyenes including dienes, trienes, conjugated diolefins, mixtures thereof, and the like. Hydrogenation process catalysts find particular utility with respect to the hydrogenation of olefins having from 2 to 20 carbon atoms per molecule, preferably from 2 to 10 carbon atoms per molecule. Representative hydrogenation olefin feedstocks include ethylene, propylene, hexenes, heptenes, octenes, cyclooctenes, cyclododecenes, cyclopentenes, dodecenes, tetradecenes, eicosenes, butadiene, pentadienes, hexadienes, heptadienes, cyclooctadienes, cyclododecatrienes, vinylcyclohexenes, cyclopentadienes, butynes, mixtures thereof, and the like.

The amount of ruthenium hydride complex employed in the isomerization or hydrogenation processes can vary widely. Preferably, an amount of complex is used which affords a reasonable amount of isomerization and/or hydrogenation within a reasonable reaction period of time.

In general, ruthenium hydride complex:olefin weight ratios of from about 0.001 to about 10 parts by weight of complex per 100 parts by weight of olefin are suitabe to the practice of this invention. Time will be about 0.5–100 hrs.

The isomerization or hydrogenation processes can be carried out as either a batch or as a continuous process using any conventional apparatus. Depending on the mode of reaction and other conditions such as reaction temperature, complex:olefin contact time can vary from 1 minute to 100 hours, at any convenient pressure, such as 0–2000 p.s.i.g.

Suitable hydrogenation pressure conditions provide for the introduction of hydrogen into the reaction vessel in an amount sufficient to maintain the pressure at which the process is effective. However, it is to be understood that the reaction conditions can provide for a portion of the operating pressure to be supplied by hydrogen with the balance being supplied by the use of the inert gas, such as argon, thus providing the operating pressure.

The isomerization or hydrogenation reaction temperatures can vary widely. In general, the reaction temperature should be such that the reactants and ruthenium complex composites are stable and do not decompose into undesirable by-products or inactive complex composites. Thus, the isomerization or hydrogenation process is generally carried out at a temperature in the range of from about −20° C. to about 70° C. and preferably at a temperature in the range of about 0° C. to about 50° C. Ordinarily, the temperature should not exceed about 80° C., at which temperature decomposition of the complex can begin.

The reaction products of this invention can be separated from the reaction mixtures by any method known in the art. Suitable separation techniques include filtration, distillation, decantation, adsorption, and the like.

Preferred ruthenium hydride complexes in the isomerization of terminally unsaturated olefins to internally unsaturated olefins, particularly to the trans form, are $(R_3Q)_3RuH_2(N_2)$ and $(R_3Q)_3RuH_2(NH_3)$ complexes since these nitrogen-containing complexes are unusually effective inhibiting the reverse isomerization of internally unsaturated olefins to terminal olefins. Since the nitrogen-containing complexes are stabilized by the presence of excess nitrogen gas, these isomerization reactions are often carried out employing nitrogen as a nonoxidizing atmosphere, preferably at a reaction pressure greater than atmospheric. However, it has also been found that purging of the reaction zone containing these ruthenium nitrogen complexes by an inert gas such as argon restores the activity of the catalyst for the double blond isomerization of internal olefins. The $(R_3Q)_3RuH_2(NH_3)$ complexes are not affected by purging with nitrogen, argon and the like as in the case of the $(R_3Q)RuH_2(N_2)$ complexes. Accordingly, under some reaction conditions, ammonia may be preferred.

The following examples are given to illustrate the processes of this invention and are not intended to unduly limit the scope of the present invention in strict accordance therewith.

EXAMPLE I

The complex (triphenylphosphine)$_3$RuH$_4$, a nearly white solid, was prepared by the reaction of (triphenylphosphine)$_3$RuCl$_2$ with sodium borohydride in methanol in accordance with the following procedure: At room temperature and pressure, a 1.0 g. (1.04 mmole) quantity of (triphenylphosphine)$_3$RuCl$_2$ was dispersed in 25 ml. methanol. A 0.25 g. (6.6 mmole) pellet of NaBH$_4$ was added with vigorous stirring under a slow stream of hydrogen. After 30 minutes, the mixture was filtered and the precipitate was washed with methanol. The precipitate was again placed in 25 ml. methanol and another 0.25 g. NaBH$_4$ pellet added. The mixture was again filtered, washed with methanol and dried in vacuo. The yield was 0.84 g. (91 percent). The product recovered was analyzed and found to contain in weight percent.

|  | Found | Calculated |
|---|---|---|
| Carbon | 72.6 | 72.4 |
| Hydrogen | 5.6 | 5.54 |
| Phosphorus | 10.5 | 10.4 |
| Chlorine | 0.0 | 0.0 |

EXAMPLE II

The complex (triphenylarsine)$_3$RuH$_4$ was prepared by dissolving at room temperature and pressure and under a helium atmosphere, 0.4 g. (approx. 1.3 mmole) triphenylarsine in 35 ml. methanol. A 1.0 g. quantity of (triphenylarsine)$_2$RuCl$_2$·MeOH was slurried in this solution and one pellet of NaBH$_4$ was added. When effervescence was over, another pellet was added and the mixture was stirred for 1 hour. The mixture was filtered, washed with methanol and dried in a helium atmosphere. A 1.1 g. quantity of (triphenylarsine)$_3$RuH$_4$ was recovered.

EXAMPLE III

The (triphenylarsine)$_3$RuH$_4$ prepared in accordance with Example II was reacted with nitrogen by subjecting approximately 0.2 g. of the product of Example II to a stream of nitrogen in a 50 ml. flask for 24 hours. The product was (triphenylarsine)$_3$RuH$_2$(N$_2$).

EXAMPLE IV

A 15 ml. quantity of pentene-1 (about 9.6 g.) was added to 0.1 gram (triphenylphosphine)$_3$RuH$_4$ in a closed vessel under an inert helium atmosphere. The mixture was stirred at room temperature and pressure. Periodically 5 microliters of liquid was removed and analyzed by gas-liquid chromatography. The following results were obtained:

TABLE I

| Time | Percent | | |
|---|---|---|---|
| | Pentene-1 | Trans-2 pentene | Cis-2 pentene |
| 0 | 100 | 0 | 0 |
| 10 minutes | 28.9 | 64.6 | 6.43 |
| 30 minutes | 28.0 | 64.7 | 7.25 |
| 1 hour | 22.8 | 71.0 | 6.20 |
| 2 hours | 21.3 | 72.0 | 6.70 |
| 5 hours | 18.8 | 73.6 | 7.6 |
| 21 hours | 12.0 | 79.4 | 8.6 |
| 20 days | 1.7 | 80.3 | 17.7 |

The above results show that the ruthenium hydride complex is an effective catalyst for isomerization of olefins since a 71 percent conversion of said olefin to the pentene-2 isomer was obtained in 10 minutes. In addition, the above results show that the complex selectivity isomerizes the pentene-1 to the trans-2 pentene isomer.

EXAMPLE V

Pentene-1 was isomerized in accordance with the procedure set out in the preceding example, with the following exception: The reactor vessel containing the (triphenylphosphine)$_3$RuH$_4$ complex, prior to initial addition of the pentene-1, was flushed with nitrogen for 30 minutes in order to convert the complex to (triphenylphosphine)$_3$Ruh$_2$(N$_2$).

The mixture was stirred at room temperature and pressure. Periodically, 5 microliters of liquid were removed and analyzed by gas-liquid chromatography. The following results were obtained:

TABLE II

| Time | Percent | | |
|---|---|---|---|
| | Pentene-1 | Trans-2 pentene | Cis-2 pentene |
| 10 minutes | 28.1 | 66.0 | 5.9 |
| 1 hour | 24.3 | 68.8 | 6.9 |
| 18 hours | 10.9 | 80.5 | 8.6 |
| 20 days | 1.71 | 81.6 | 16.4 |

These results show that the (triphenylphosphine)$_3$RuH$_2$(N$_2$)

complex is also an effective catalyst for isomerizing pentene-1 and also favors the formation of trans-2-pentene product.

EXAMPLE VI

Into a closed vessel equipped with a rubber seal was placed 0.1 g. (triphenylphosphine)$_3$RuH$_4$. The vessel was flushed with anhydrous ammonia for 5 minutes, then left standing overnight at room temperature. After 16 hours, the solid catalyst composite had turned a deep yellow having been converted to (triphenylphosphine)$_3$RuH$_2$(NH$_3$).

Ten ml. (about 6.4 g.) of pentene-1 were added and the mixture was stirred at room temperature and pressure. The mixture was periodically sampled and analyzed. The results are set out below:

TABLE III

| Time | Percent | | |
|---|---|---|---|
| | Pentene-1 | Trans-2 pentene | Cis-2 pentene |
| 0 | 100 | | |
| 25 minutes | 97.3 | 2.3 | 0.36 |
| 3 hours | 90.3 | 8.5 | 1.0 |
| 7 hours | 82.2 | 16.5 | 1.5 |
| 74 hours [1] | 32.0 | 63.1 | 4.6 |
| 75 hours | 31.8 | 63.0 | 4.9 |
| 99 hours | 16.0 | 77.0 | 6.6 |
| 120 hours | 10.5 | 82.2 | 6.7 |

[1] At this point the sample was cooled to dry ice-acetone temperature, and the vessel was flushed with argon for 1 hour. The reaction mixture was then warmed and room temperature and operation was resumed.

The above results show that the (triphenylphosphine)$_3$RuH$_2$(NH$_3$) complex is also an effective isomerization catalyst for converting terminal olefins to internal olefins, particularly to the trans form. In addition, the above example shows that purging of the reaction mixture with argon increases the reaction rate somewhat.

EXAMPLE VII

Pentene-2 was isomerized by contact with (triphenylphosphine)$_3$RuH$_4$ in a manner similar to the preceding examples. A 0.1 g. quantity of the complex was stirred with 20 ml. (about 13 g.) of pentene-2 at room temperature and pressure with periodic sampling and analysis of the mixture. The results are shown below:

TABLE IV

| Time | Percent | | | |
|---|---|---|---|---|
| | n-Pentane | 1-pentene | t-2-pentene | c-2-pentene |
| 0 | 0.28 | 0.06 | 75.6 | 24.1 |
| 10 minutes | 0.36 | 0.50 | 76.2 | 22.1 |
| 30 minutes | 0.36 | 1.27 | 75.5 | 22.7 |
| 1 hour | 0.36 | 1.58 | 75.4 | 22.6 |
| 3 hours | 0.34 | 1.85 | 75.2 | 22.6 |
| 19 hours | 0.34 | 1.91 | 75.4 | 22.4 |
| 68 hours | 0.34 | 1.92 | 77.1 | 20.7 |

These results show that the (triphenylphosphine)$_3$Ruh$_4$ complex catalyzes the reaction of internal olefins slower than for the reverse process.

EXAMPLE VIII

Pentene-2 was isomerized in accordance with the procedure set out in Example VII with the following exception: The (triphenylphosphine)$_3$RuH$_4$, prior to the initial addition of the pentene-2 olefin, was flushed with nitrogen for 1 hour, left under a positive nitrogen pressure for 16 hours, and flushed again with nitrogen for 3 additional hours at room temperature to form the (triphenylphosphine)$_3$RuH$_2$(N$_2$) complex. Thereafter, pentene-2 was added, and the mixture was stirred and sampled periodically. The results were as follows:

TABLE V

| Time | Percent | | | |
| --- | --- | --- | --- | --- |
| | n-Pentane | Pentene-1 | Trans-2 pentene | Cis-2 pentene |
| Feed | 0.28 | 0.06 | 75.5 | 24.1 |
| 10 minutes | 0.30 | 0.10 | 75.3 | 24.3 |
| 30 minutes | 0.30 | 0.10 | 76.5 | 23.0 |
| 1.75 hours | 0.25 | 0.13 | 76.0 | 23.5 |
| 19.67 hours | 0.26 | 0.21 | 75.1 | 24.4 |
| 42.33 hours | 0.35 | 0.42 | 76.6 | 22.6 |

The reaction vessel was then flushed with argon for 10 minutes, with the sample at 0° C., plus an additional 5 minutes purge with argon while the sample returned to room temperature. Stirring at room temperature with periodic sampling was resumed.

TABLE V.—Continued

| Time after flush | Percent | | | |
| --- | --- | --- | --- | --- |
| | n-Pentane | Pentene-1 | Trans-2 pentene | Cis-2 pentene |
| 15 minutes | 0.29 | 0.38 | 75.0 | 24.1 |
| 50 minutes | 0.28 | 0.60 | 76.3 | 22.8 |
| 6 hours | 0.33 | 1.42 | 76.4 | 21.8 |
| 22 hours | 0.29 | 1.86 | 75.8 | 22.0 |

From the above data, it is apparent that the (triphenylphosphine)$_3$RuH$_2$(N$_2$) complex does not appreciably catalyze the isomerization of pentene-2 to pentene-1 but this activity is significantly restored by flushing of the catalyst with argon.

EXAMPLE IX

This experiment was performed in accordance with the procedure set out in Example VII with the following exception: The (triphenylphosphine)$_3$RuH$_4$ complex was flushed with anhydrous ammonia, left under ammonia for 20 hours, and flushed again with ammonia at room temperature to form the (triphenylphosphine)$_3$RuH$_2$(NH$_3$)

complex before adding the pentene-2. The results were as follows:

TABLE VI

| Time | Percent | | | |
| --- | --- | --- | --- | --- |
| | n-Pentane | Pentene-1 | Trans-2 pentene | Cis-2 pentene |
| 0 | 0.28 | 0.06 | 75.6 | 24.1 |
| 4.5 hours | 0.28 | 0.06 | 75.6 | 24.1 |

At this time, the sample was flushed with argon for 40 minutes, with the sample at 0° C. until no odor of ammonia could be detected in the flush gases. Stirring at room temperature and periodic sampling was resumed.

TABLE VI.—Continued

| Time after flush | Percent | | | |
| --- | --- | --- | --- | --- |
| | n-Pentane | Pentene-1 | Trans-2 pentene | Cis-2 pentene |
| 2.5 hours | 0.28 | 0.04 | 78.9 | 20.8 |
| 66 hours | 0.26 | 0.20 | 75.6 | 23.9 |

The above results indicate that pretreatment of the (triphenylphosphine)$_3$RuH$_4$ complex with ammonia substantially destroys the activity for isomerization of pentene-2 to pentene-1. Moreover, flushing with argon has little effect. Comparison of the data of this example with those of Example VI indicates that the ammonia complex is selective for isomerization of terminal olefins to internal olefins.

EXAMPLE X

In to a 3-ounce reaction tube under helium was placed 0.1 g. of (triphenylphosphine)$_3$RuH$_4$ and 20 ml. (about 13 g.) pentene-2 isomer (same composition as in Example VII). The tube was placed in a bath at 15° C. and hydrogen added on demand with stirring at 40 p.s.i.g. for 20 minutes, thereafter at 60 p.s.i.g. Hydrogen consumption was rapid for the first 15 minutes and hydrogen addition to the olefin was essentially complete after 2 hours. The reactants were left under hydrogen-positive pressure for 24 hours at room temperature. During this period, very little hydrogen was consumed. No hydrogen consumption occured during the next six days. The liquid was analyzed and found to be pentane illustrating that the complexes of this invention are active for catalyzing hydrogenation of olefinic unsaturation.

Reasonable variations and modifications are possible within the scope of the foregoing disclosure and the appended claims to the invention.

We claim:

1. A process for the isomerization of olefin feedstocks under suitable isomerization conditions comprising contacting terminally unsaturated olefins with a ruthenium hydride complex containing ligands selected from tertiary phosphine, arsine, and stibine, thereby isomerizing at least a portion of said terminally unsaturated olefins to internally unsaturated olefins.

2. A process in accordance with claim 1 wherein said contacting is carried out in the substantial absence of hydrogen.

3. A process in accord with claim 2, wherein said ruthenium hydride complex is represented by the formula $$(R_3Q)_3RuH_2Z$$

wherein each Q is independently selected from phosphorus, arsenic, and antimony, Z is selected from H$_2$, N$_2$ and NH$_3$, each R is independently selected from organic radicals containing up to 20 carbon atoms.

4. A process in accord with claim 3 wherein Q is phosphorus.

5. A process in accord with claim 3 wherein Q is arsenic.

6. A process in accord with claim 3 wherein Q is antimony.

7. A process in accord with claim 3 wherein said R$_3$Q is triphenyl phosphine.

8. A process in accord with claim 3 wherein said contacting is carried out in the substantial absence of air or oxygen.

9. A process in accord with claim 8 wherein Z is N$_2$.

10. A process in accord with claim 8 wherein Z is H$_2$.

11. A process in accord with claim 8 wherein Z is NH$_3$.

12. A process in accord with claim 8 wherein aid process is selective to the isomerization of terminally unsaturated olefins to internally unsaturated olefins and inhibits the reverse isomerization of internally unsaturated olefins to terminally unsaturated olefins, said ruthenium hydride complex being represented by the formula (R$_3$Q)$_3$RuH$_2$Z wherein Z is selected from N$_2$ and ammonia, and R and Q are as represented hereinbefore.

13. A process in accord with claim 12 wherein at least a portion of said terminally unsaturated olefin is a straight chain olefin and at least a portion of said internally unsaturated olefin is a straight chain olefin.

14. A process in accord with claim 13 wherein each said R is free of active hydrogen atoms, free of reactive unsaturation and said organic radicals are alkyl, cycloalkyl, aryl hydrocarbyl radicals, and mixtures thereof.

15. A proces in accordance with claim 14 wherein said R is independently selected from organic radicals containing up to 10 carbon atoms.

16. A process in accord with claim 15 wherein said terminally unsaturated olefin is selected from the class consisting of acyclic monoenes, acyclic polyenes, and mixtures thereof.

17. A process in accord with claim 8 wherein said contacting is carried out in an inert atmosphere, in the presence of an inert organic solvent, and in the presence of said ruthenium hydride complex present in an amount in the range of about 0.001 to about 10 parts by weight per 100 parts by weight of olefin contained within the contact zone at suitable temperature and pressure, and for a suitable reaction period.

18. A process in accord with claim 17 wherein said pressure is within the range of about 0 to about 2000 p.s.i.g., said temperature is within a range of about −20° C. to about 70° C., and said reaction period is in the range of about 1 minute to about 100 hours.

19. A process in accord with claim 18 wherein the contact is carried out under heterogeneous reaction conditions wherein said ruthenium hydride complex is supported on a solid inorganic oxide.

20. A process comprising contacting under suitable hydrogenation conditions hydrogen and an olefin reactant with a ruthenium hydride complex represented by the formula $(R_3Q)_3RuH_4$ wherein each Q is independently selected from phosphorus, arsenic, and antimony each R is independently selected from organic radicals containing up to 20 carbon atoms; said contacting being carried out in the presence of an inert organic solvent and in the presence of said ruthenium hydride complex present in an amount in the range of from about 0.001 to about 10 parts by weight per 100 parts by weight of olefin, said contacting being carried out at a pressure within the range of from about 0 to about 2000 p.s.i.g., a temperature within the range of from about −20° C. to about 70° C., for a period of time within the range of from about 1 minute to about 100 hours.

21. A process in accord with claim 20 wherein said R is free of active hydrogen atoms, free of reactive unsaturation and said organic radicals are alkyl, cycloalkyl, aryl hydrocarbyl radicals and mixtures thereof containing up to 10 carbon atoms, said olefin reactant is selected from the class consisting of acyclic monoenes, acylic polyenes and mixtures thereof containing from 2 to 10 carbon atoms, and wherein Q is phosphorus.

22. A process in accord with claim 20 wherein said R is free of active hydrogen atoms, free of reactive unsaturation and said organic radicals are alkyl, cycloalkyl, aryl hydrocarbyl radicals and mixtures thereof containing up to 10 carbon atoms, said olefin reactant is selected from the class consisting of acyclic monoenes, acyclic polyenes and mixtures thereof containing from 2 to 10 carbon atoms and wherein Q is arsenic.

23. A process in accord with claim 20 wherein said R is free of active hydrogen atoms free of reactive unsaturation and said organic radicals are alkyl cycloalkyl aryl hydrocarbyl radicals and mixtures thereof containing up to 10 carbon atoms said olefin reactant is selected from the class consisting of acyclic monoenes acyclic polyenes and mixtures thereof containing from 2 to 10 carbon atoms and wherein Q is antimony.

References Cited

UNITED STATES PATENTS

| | | | |
|---|---|---|---|
| 3,524,899 | 8/1970 | Candlin et al. | 260—683.9 |
| 3,454,644 | 7/1969 | Dewhirst | 260—683.9 |
| 3,671,597 | 6/1972 | Kroll | 260—683.2 |
| 3,597,510 | 8/1971 | Pollak et al. | 260—683.2 |

DELBERT E. GANTZ, Primary Examiner

C. E. SPRESSER, Jr., Primary Examiner

U.S. Cl. X.R.

260—666 A, 683.9

UNITED STATES PATENT OFFICE
CERTIFICATE OF CORRECTION

Patent No. 3,793,257      Dated February 19, 1974

Inventor(s) Filippo Pennella and Mark R. Rycheck

It is certified that error appears in the above-identified patent and that said Letters Patent are hereby corrected as shown below:

Column 8, line 45, delete "aid" and insert -- said --;
        line 61, delete "accordance" and insert -- accord --;
        line 61, after "wherein" insert -- each --;
        line 71, delete "of".
Column 9, line 14, after "antimony" insert a semicolon.
Column 10, line 12, after "atoms" insert a comma;
        line 13, after "alkyl" insert a comma;
        line 13, after "cycloalkyl" insert a comma;
        line 15, after "atoms" insert a comma;
        line 16, after "monoenes" insert a comma;
        line 18, after "atoms" insert a comma.

Signed and sealed this 24th day of June 1975.

(SEAL)
Attest:

RUTH C. MASON
Attesting Officer

C. MARSHALL DANN
Commissioner of Patents
and Trademarks